(12) United States Patent
Goldman-Shenhar et al.

(10) Patent No.: US 10,198,696 B2
(45) Date of Patent: Feb. 5, 2019

(54) APPARATUS AND METHODS FOR CONVERTING USER INPUT ACCURATELY TO A PARTICULAR SYSTEM FUNCTION

(71) Applicant: GM GLOBAL TECHNOLOGY OPERATIONS LLC, Detroit, MI (US)

(72) Inventors: Claudia V. Goldman-Shenhar, Mevasseret Zion (IL); Asaf Degani, Raanana (IL); Omer Deutsch, Kfar Saba (IL); Sean Richard Stelzer, West Bloomfield, MI (US); Timothy J. Grost, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 443 days.

(21) Appl. No.: 14/611,625

(22) Filed: Feb. 2, 2015

(65) Prior Publication Data
US 2015/0220068 A1 Aug. 6, 2015

Related U.S. Application Data

(60) Provisional application No. 61/935,528, filed on Feb. 4, 2014.

(51) Int. Cl.
*G06N 99/00* (2010.01)
*G06K 9/00* (2006.01)
(Continued)

(52) U.S. Cl.
CPC ....... *G06N 99/005* (2013.01); *G06K 9/00355* (2013.01); *G02B 27/0093* (2013.01);
(Continued)

(58) Field of Classification Search
None
See application file for complete search history.

(56) References Cited

U.S. PATENT DOCUMENTS 4,534,056 A * 8/1985 Feilchenfeld ........... B66B 1/468
340/5.52
4,590,604 A * 5/1986 Feilchenfeld ........... B66B 1/468
704/272

(Continued)

OTHER PUBLICATIONS

Pickering, C.A.; Burnham, K.J. and Richardson, M.J., "A Research Study of Hand Gesture Recognition Technologies and Applications for Human Vehicle Interaction", Jun. 28-29, 2007, $3^{rd}$ Institution of Engineering and Technology Conf. on Automotive Electronics.*
Rahman, A.S.M.M.; Saboune, J. and El Saddik, A., "Motion-Path Based in Car Gesture Control of the Multimedia Devices", Nov. 4, 2011, DIVANet '11, ACM.*
Riener, A., "Driver-Vehicle Confluence or How to Control your Car in Future?", Oct. 17-19, 2012, Proceedings of the $4^{th}$ Intl Conf on Automotive User Interfaces and Interactive Vehicular Applications.*
Taib, R.; Yu, K.; Jung, J.; Hess, A. and Maier, A., "Human-Centric Analysis of Driver Inattention", Jun. 23-26, 2013, 2013 IEEE Intelligent Vehicles Symposium Workshops (IV Workshops).*
German Office Action dated Jan. 26, 2016 for related German Patent Application No. 102015101507.2.

*Primary Examiner* — Mohammad Ali
*Assistant Examiner* — Kelvin Booker
(74) *Attorney, Agent, or Firm* — Tiffany N. Logan; Parks IP Law LLC

(57) ABSTRACT

An apparatus for use in adjusting a controllable system based on a user-communication input, such as non-detailed or indiscriminate input. The apparatus includes a processor and a computer-readable storage medium comprising instructions that, when executed by the processor, cause the processor to perform operations for determining an objective system command, corresponding to the user input, for use in adjusting the controllable system.

15 Claims, 3 Drawing Sheets

(51) Int. Cl.
  *G10L 15/30* (2013.01)
  *G02B 27/00* (2006.01)
  *G10L 15/26* (2006.01)
  *G06F 3/01* (2006.01)

(52) U.S. Cl.
  CPC .............. *G06F 3/017* (2013.01); *G10L 15/26* (2013.01); *G10L 15/30* (2013.01)

(56) References Cited

U.S. PATENT DOCUMENTS

| | | | | |
|---|---|---|---|---|
| 4,771,390 A * | 9/1988 | Dolph | ................. | B60R 16/0373 704/258 |
| 4,825,385 A * | 4/1989 | Dolph | ................. | B60R 16/0373 340/539.1 |
| 6,009,355 A * | 12/1999 | Obradovich | ....... | B60G 17/0195 340/815.4 |
| 6,230,138 B1 * | 5/2001 | Everhart | ................. | G10L 15/26 454/74 |
| 8,170,656 B2 * | 5/2012 | Tan | ..................... | G06F 3/015 345/157 |
| 8,471,677 B2 * | 6/2013 | Fitzgibbon | ......... | G07C 9/00182 340/5.52 |
| 8,620,842 B1 * | 12/2013 | Cormack | ............. | G06N 99/005 706/12 |
| 9,037,530 B2 * | 5/2015 | Tan | ..................... | A61B 5/0488 706/62 |
| 9,064,006 B2 * | 6/2015 | Hakkani-Tur | .... | G06F 17/30663 |
| 9,633,317 B2 * | 4/2017 | Gabel | .................... | G06N 5/022 |
| 9,691,378 B1 * | 6/2017 | Meyers | ................... | G10L 15/08 |
| 2001/0020202 A1 * | 9/2001 | Obradovich | ........... | B60K 35/00 701/1 |
| 2002/0156555 A1 * | 10/2002 | Obradovich | ............ | H04L 67/04 701/1 |
| 2002/0198635 A1 * | 12/2002 | Obradovich | ......... | B62D 15/028 701/1 |
| 2006/0022833 A1 * | 2/2006 | Ferguson | ............... | A63F 13/211 340/573.1 |
| 2006/0132382 A1 * | 6/2006 | Jannard | ................... | G02C 11/06 345/8 |
| 2006/0149558 A1 * | 7/2006 | Kahn | ..................... | G10L 15/063 704/278 |
| 2007/0288242 A1 * | 12/2007 | Spengler | ................. | G10L 15/20 704/275 |
| 2008/0120102 A1 * | 5/2008 | Rao | ......................... | G10L 15/22 704/235 |
| 2009/0204410 A1 * | 8/2009 | Mozer | ..................... | G10L 15/30 704/275 |
| 2009/0278915 A1 * | 11/2009 | Kramer | .................... | G06F 3/017 348/48 |
| 2010/0076644 A1 * | 3/2010 | Cahill | ..................... | G07C 5/0808 701/31.4 |
| 2010/0235451 A1 * | 9/2010 | Yu | ............................ | G06F 15/16 709/206 |
| 2012/0007713 A1 * | 1/2012 | Nasiri | .................... | G06F 1/1694 340/5.81 |
| 2012/0016561 A1 * | 1/2012 | Pinte | ..................... | F16D 48/066 701/68 |
| 2012/0065972 A1 * | 3/2012 | Strifler | .................... | G10L 15/26 704/246 |
| 2012/0194418 A1 * | 8/2012 | Osterhout | .......... | G02B 27/0093 345/156 |
| 2012/0194419 A1 * | 8/2012 | Osterhout | .......... | G02B 27/0093 345/156 |
| 2012/0194420 A1 * | 8/2012 | Osterhout | .......... | G02B 27/0093 345/156 |
| 2012/0194549 A1 * | 8/2012 | Osterhout | .......... | G02B 27/0093 345/633 |
| 2012/0194550 A1 * | 8/2012 | Osterhout | .......... | G02B 27/0093 345/633 |
| 2012/0194551 A1 * | 8/2012 | Osterhout | .......... | G02B 27/0093 345/633 |
| 2012/0194552 A1 * | 8/2012 | Osterhout | .......... | G02B 27/0093 345/633 |
| 2012/0194553 A1 * | 8/2012 | Osterhout | .......... | G02B 27/0093 345/633 |
| 2012/0200488 A1 * | 8/2012 | Osterhout | .......... | G02B 27/0093 345/156 |
| 2012/0200499 A1 * | 8/2012 | Osterhout | .......... | G02B 27/0093 345/158 |
| 2012/0200601 A1 * | 8/2012 | Osterhout | .......... | G02B 27/0093 345/633 |
| 2012/0206322 A1 * | 8/2012 | Osterhout | .......... | G02B 27/0093 345/8 |
| 2012/0206323 A1 * | 8/2012 | Osterhout | .......... | G02B 27/0093 345/8 |
| 2012/0206334 A1 * | 8/2012 | Osterhout | ............... | G06F 1/163 345/156 |
| 2012/0206335 A1 * | 8/2012 | Osterhout | .......... | G02B 27/0093 345/156 |
| 2012/0206485 A1 * | 8/2012 | Osterhout | .......... | G02B 27/0093 345/633 |
| 2012/0212398 A1 * | 8/2012 | Border | ................. | G02B 27/017 345/8 |
| 2012/0212400 A1 * | 8/2012 | Border | ................. | G02B 27/017 345/8 |
| 2012/0212414 A1 * | 8/2012 | Osterhout | ............ | G02B 27/017 345/158 |
| 2012/0212484 A1 * | 8/2012 | Haddick | ........... | G02B 27/0093 345/419 |
| 2012/0212499 A1 * | 8/2012 | Haddick | ........... | G02B 27/0093 345/589 |
| 2012/0215543 A1 * | 8/2012 | Oz | ........................... | G06F 3/167 704/275 |
| 2012/0218301 A1 * | 8/2012 | Miller | ................... | G02B 27/017 345/633 |
| 2012/0235883 A1 * | 9/2012 | Border | ............... | G02B 27/0093 345/8 |
| 2012/0235886 A1 * | 9/2012 | Border | ............... | G02B 27/0093 345/8 |
| 2012/0235887 A1 * | 9/2012 | Border | ............... | G02B 27/0093 345/8 |
| 2012/0235900 A1 * | 9/2012 | Border | ...................... | G02B 5/23 345/156 |
| 2012/0254074 A1 * | 10/2012 | Flinn | ........................ | G06N 7/02 706/4 |
| 2013/0117201 A1 | 5/2013 | Weising | | |
| 2013/0127980 A1 * | 5/2013 | Haddick | ................. | G06F 3/013 348/14.08 |
| 2013/0278631 A1 * | 10/2013 | Border | ................. | G02B 27/017 345/633 |
| 2013/0314303 A1 * | 11/2013 | Osterhout | ............. | G06F 3/005 345/8 |
| 2014/0058528 A1 * | 2/2014 | Contreras-Vidal | ......... | A61B 5/04842 623/25 |
| 2014/0123062 A1 * | 5/2014 | Nguyen | ............. | G01C 21/3682 715/810 |
| 2014/0242560 A1 * | 8/2014 | Movellan | ............... | G09B 19/00 434/236 |
| 2014/0380285 A1 * | 12/2014 | Gabel | .................... | G06N 5/022 717/139 |
| 2014/0380286 A1 * | 12/2014 | Gabel | ...................... | G06F 8/20 717/139 |
| 2015/0309316 A1 * | 10/2015 | Osterhout | ............... | G06F 1/163 345/8 |
| 2016/0187654 A1 * | 6/2016 | Border | ..................... | G02B 5/04 359/567 |
| 2016/0187992 A1 * | 6/2016 | Yamamoto | ............. | G06F 3/017 345/156 |
| 2016/0209648 A1 * | 7/2016 | Haddick | ........... | G02B 27/0093 |
| 2016/0235323 A1 * | 8/2016 | Tadi | ..................... | A61B 5/7285 |

* cited by examiner

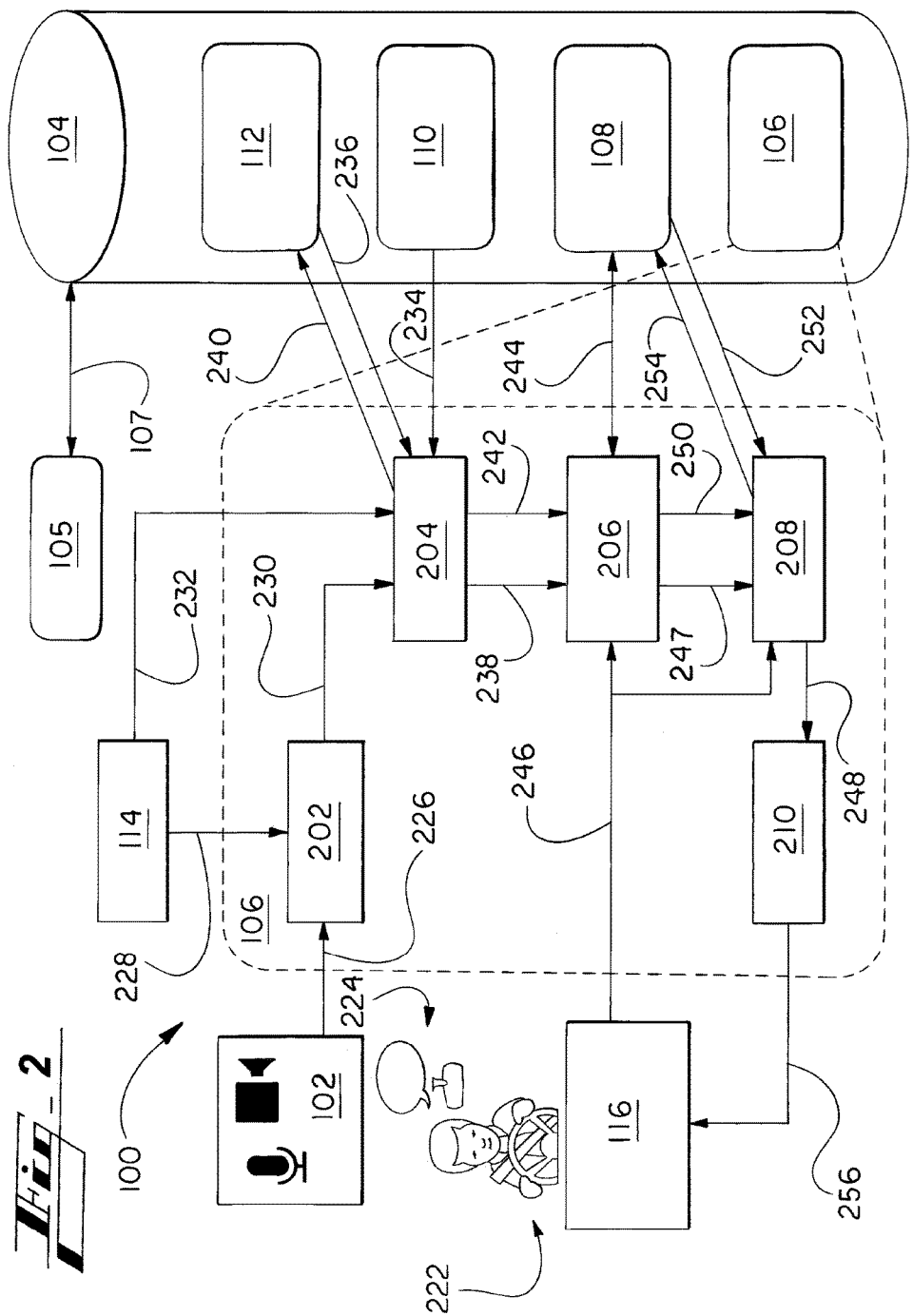

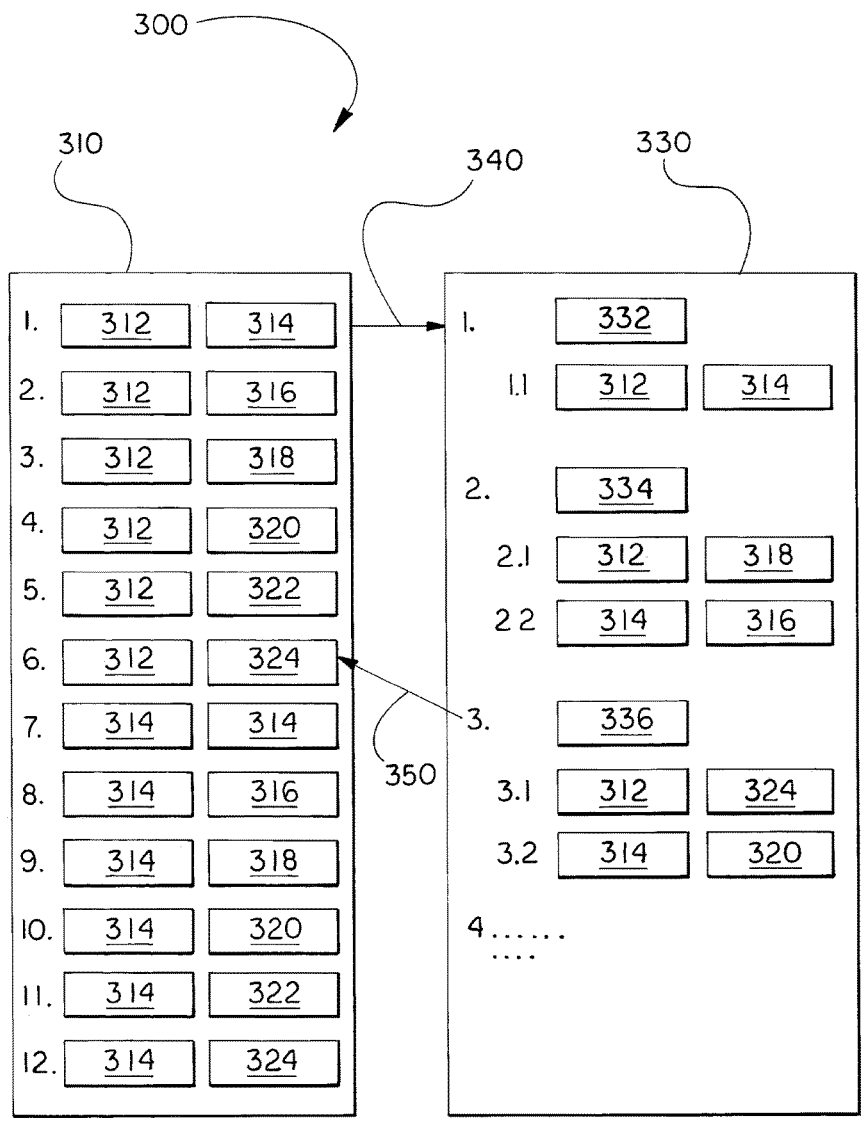

APPARATUS AND METHODS FOR CONVERTING USER INPUT ACCURATELY TO A PARTICULAR SYSTEM FUNCTION

TECHNICAL FIELD

The present disclosure relates generally to interpreting various types of user communication to an apparatus and, more particularly, to converting user communication, even if non-detailed or indiscriminate, to an appropriate change in function of a system such as an automotive system.

BACKGROUND

Conventional vehicle systems are designed with relatively course setting controls. A heating, ventilating, and air-conditioning (HVAC) system is an example. A conventional HVAC control panel may allow a vehicle operator to control a fan to operate at one of four settings—off, low, medium, high, for instance. The fixed, one-size-fits-all, nature of these systems has numerous shortcomings.

Conventional control systems, such as automobile or other vehicle control systems, are not configured to allow users to control them naturally. A user cannot interact with the systems in any ways similar to how they interact with a person. A house guest is more likely to ask a host whether it seems a tad warm, for example, than to ask them to turn the temperature down 6.5 degrees, let alone request detailed actions such as lowering a humidity setting by 5 percentage points, or increasing a fan speed setting by 20%. Conventional control systems do not effect desired or otherwise appropriate changes in system operation in response to the user providing any of a wide variety of inputs, including non-detailed or indiscriminate input.

Another shortcoming of conventional control systems is that users often do not know an optimal manner to adjust the systems to reach a desired result. In the previous example, for instance, the house guest may know that the temperature should be lowered, but not by how much, or that another course of action, such as involving changes to humidity and fan speed, would actually be more effective under the circumstances.

Still another shortcoming of conventional systems is that a fixed design of the system may not necessarily match the user's way of thinking or interacting. Similarly, a user will likely not know each adjustable sub-system and their settings. This can be explained by way of example with reference to a context of a vehicle suspension system. A vehicle operator (e.g., driver) may feel that his or her vehicle seems to lean too much in turning maneuvers. The operator is not likely to know, though, how an adjustable suspension of the vehicle should be adjusted to improve the cornering feel.

The shortcomings of conventional system can lead to inefficient or ineffective use of the subject vehicle, program, device, premises, e.g., and sometimes user frustration.

SUMMARY

The present disclosure relates to an apparatus for determining a system command corresponding to any of a wide variety of user inputs, including non-detailed or indiscriminate input. As an example input, the user may utter "ugh" in response to the user feeling that an environment is too hot, or wipe their hand across their brow, to wipe sweat away or symbolize doing so.

The apparatus includes a processor and a computer-readable storage medium comprising instructions that, when executed by the processor, cause the processor to perform operations for determining a system command to be implemented by a system such as a vehicle system.

In an embodiment, the instructions including a plurality of modules including an interpretation module, an analysis module, a goal-recognizer module, and a translation module.

In an embodiment, the plurality of modules further include an execute module.

In an embodiment, the computer-readable storage medium comprises, for use by the instructions in performing the operations, multiple databases.

In an embodiment, the databases include one or more of a user model-database, a semantics database, and an available-system-states database.

In an embodiment, the instructions include code that, when executed, cause the processor to perform learning functions.

In an embodiment, the instructions include code that, when executed, cause the processor to, based on past apparatus operations and current conditions, recommend an appropriate action to a user, such as a driver of a vehicle.

In one embodiment, the instructions include code that, when executed, cause the processor to, based on past apparatus operations and current conditions, take an action automatically.

In an embodiment, the instructions include code that, when executed, cause the processor to, based on past apparatus operations and current conditions, provide a communication, for receipt by a user, advising that an action will be taken automatically.

In an embodiment, the instructions include code that, when executed, cause the processor to, based on past apparatus operations and current conditions, provide the communication, for receipt by the user, advising that the action will be taken automatically, provide the communication advising that the action will be taken absent a command from the user otherwise.

In an embodiment, (a) the interpretation module, when executed by the processor, cause the processor to filter and/or adjust user input to produce initially-processed output, (b) the analysis module, when executed by the processor, cause the processor to convert the initially-processed output to a precursor, representing apparent user desire, need, or preference, (c) the goal-recognizer module, when executed by the processor, cause the processor to generate based on the precursor, subjective system output or command indicating how the system should apparently be adjusted based on the apparent user desire, need, or preference, and (d) the translation module, when executed by the processor, cause the processor to generate based on the subjective system output an objective system command.

In one embodiment, (i) the interpretation module, when executed by the processor, cause the processor to filter and/or adjust user input to produce initially-processed output, (ii) the analysis module, when executed by the processor, cause the processor to convert the initially-processed output to a precursor, representing apparent user desire, need, or preference, (iii) the goal-recognizer module, when executed by the processor, cause the processor to generate based on the precursor, subjective system output or command indicating how the system should apparently be adjusted based on the apparent user desire, need, or preference, (iv) the translation module, when executed by the processor, cause the processor to generate based on the subjective system output an objective system command, and (v) the execute module, when executed by the processor, cause the processor to execute the objective system command for adjusting the relevant system(s) in accord with the determined precursor and subjective system output corresponding to the user input.

In another aspect, the present technology relates to a computer-readable storage medium comprising instructions that, when executed by a processor, cause the processor to perform operations comprising receiving an user input, such as non-detailed or indiscriminate input—e.g., the user, in response to feeling that the interior of the car is too hot, making an utterance of "ugh," or wiping their hand across brow, to wipe sweat away or to symbolize wiping away of sweat. The operations further comprise determining, based on the input, a system command, for implementation by a system, corresponding to the user input.

In an embodiment of this second aspect, the instructions comprise a plurality of modules including an interpretation module, an analysis module, a goal-recognizer module, and a translation module.

In an embodiment, the plurality of modules further include an execute module.

In an embodiment, the computer-readable storage medium comprises, for use by the instructions in performing the operations, multiple databases.

In one embodiment, the databases include one or more of a user-model database, a semantics database, and an available-system-states database.

In an embodiment, the instructions include code that, when executed, cause the processor to perform learning functions.

In one embodiment, the instructions include code that, when executed, cause the processor to, based on past operations and current conditions, recommend an action to a user.

In an embodiment, the instructions include code that, when executed, cause the processor to, based on past operations and current conditions, take an action automatically.

In an embodiment, the instructions include code that, when executed, cause the processor to, based on past operations and current conditions, provide a communication, for receipt by a user, advising that an action will be taken automatically.

In an embodiment, the instructions include code that, when executed, cause the processor to, based on past operations and current conditions, provide the communication, for receipt by the user (e.g., vehicle user), advising that the action will be taken automatically, provide the communication advising that the action will be taken absent a command from the user otherwise.

In an embodiment, (A) the interpretation module, when executed by the processor, cause the processor to filter and/or adjust user input to produce initially-processed output, (B) the analysis module, when executed by the processor, cause the processor to convert the initially-processed output to a precursor, representing apparent user desire, need, or preference, (C) the goal-recognizer module, when executed by the processor, cause the processor to generate based on the precursor, subjective system output or command indicating how the system should apparently be adjusted based on the apparent user desire, need, or preference, and (D) the translation module, when executed by the processor, cause the processor to generate based on the subjective system output an objective system command.

In an embodiment, (I) the interpretation module, when executed by the processor, cause the processor to filter and/or adjust user input to produce initially-processed output, (II) the analysis module, when executed by the processor, cause the processor to convert the initially-processed output to a precursor, representing apparent user desire, need, or preference, (III) the goal-recognizer module, when executed by the processor, cause the processor to generate based on the precursor, subjective system output or command indicating how the system should apparently be adjusted based on the apparent user desire, need, or preference, (IV) the translation module, when executed by the processor, cause the processor to generate based on the subjective system output an objective system command, and (V) the execute module, when executed by the processor, cause the processor to execute the objective system command for adjusting the system (e.g., vehicle system) in accord with the determined precursor and subjective system output corresponding to the user input.

In various aspects, the present technology includes processes and methods comprising any of the functions, and performed by any of the apparatus, systems, components or devices, described above.

Other aspects of the present technology will be in part apparent and in part pointed out hereinafter.

DESCRIPTION OF THE DRAWINGS

FIG. 2 illustrates schematically a block diagram showing the components of the apparatus of FIG. 1 and functions thereof.

FIG. 3 illustrates interaction between example available and potential states for the controllable system.

DETAILED DESCRIPTION

Figure 1:
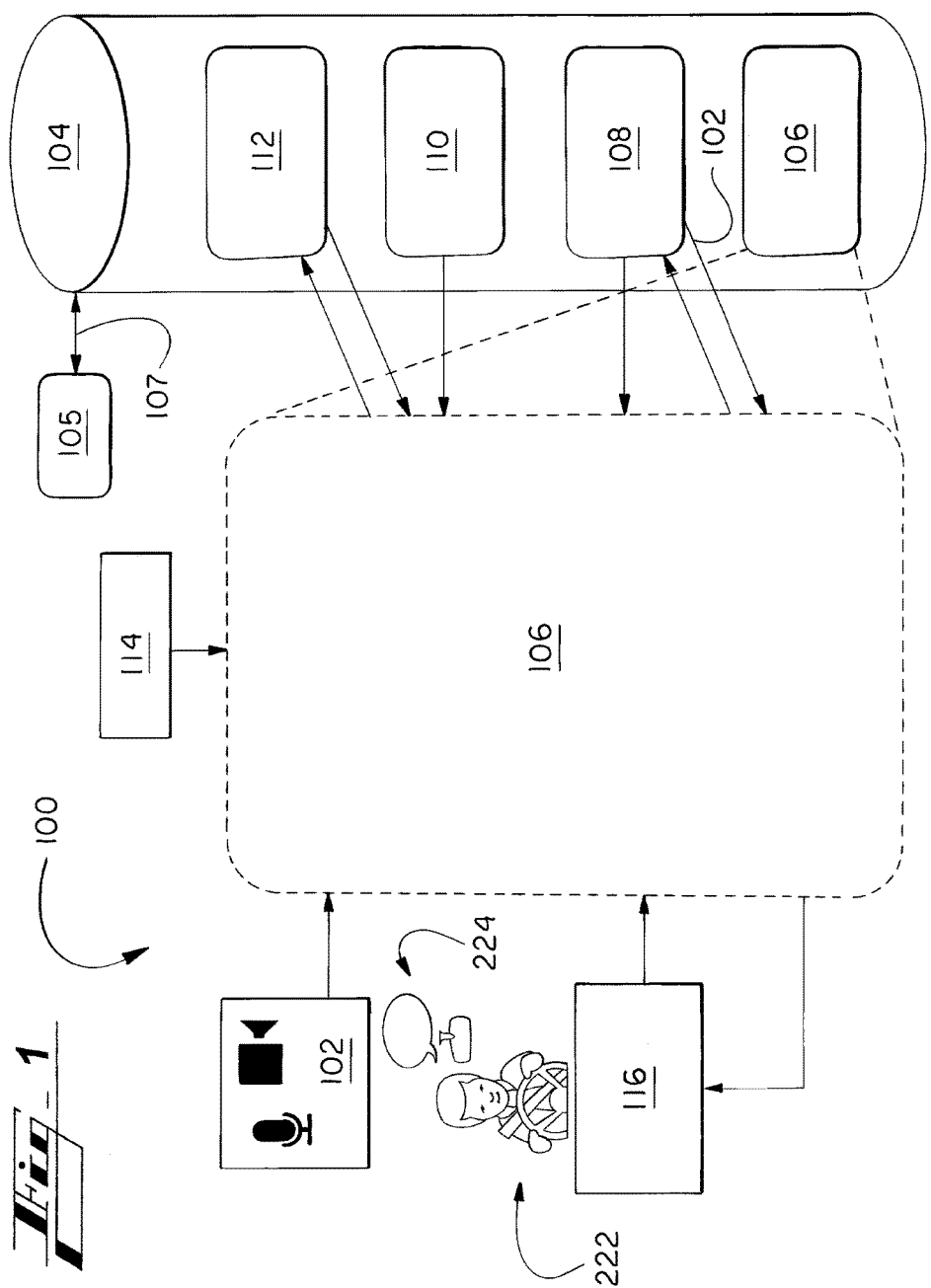
FIG. 1 illustrates schematically a block diagram showing components of an example apparatus according to the present technology for controlling a system based at least in part on user communication.

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model, or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to employ the present disclosure.

While the present technology is described primarily herein in connection with automobiles, the technology is not limited to automobiles. The concepts can be used in a wide variety of applications, such as in connection with aircraft, marine craft, residential uses, commercial uses, such as in hotel rooms, and other.

I. OVERVIEW OF THE TECHNOLOGY

The present technology is configured to interpret user communications to identify underlying user intentions, desires, goals, needs, or the like. System, further, identify and execute one or more appropriate commands matching the aims identified. User communications can include non-detailed, non-descript, or indiscriminate communications, such as utterances and/or gestures.

In various embodiments, the present disclosure describes apparatus, systems, computer-readable media, and processes for interpreting user input received by way of one or more of multiple modes of input. The input can be received by, for instance, one or more user- or human-machine interfaces (UMI, HMI). Input of more than one mode can be referred to as multimodal input. Example input modes include oral (e.g., voice), other sound modes, gestures, and touch, such as by way of a touch screen or other touch-sensitive apparatus.

The apparatus converts the underlying user inputs interpreted to at least one particular output function corresponding to the input.

In some embodiments, the interpretation and conversions are performed based also on one or more pieces of ancillary input. Ancillary input can include, e.g., weather, environmental, or other contextual data, and pre-set or pre-stored user preferences.

The technology can be used for improving operation or comfort for a user of a vehicle such as an automobile. More specifically, the technology can be used to adjust an HVAC system accurately and efficiently. Results include more efficient vehicle use and improved comfort for all occupants, and so an improved user experience and great user satisfaction with the vehicle.

Other example uses for the present technology, in addition to HVAC applications, include with navigation systems, autonomous- or semi-autonomous driving systems (e.g., automatic cruise control), electronically-controllable vehicle-suspension system, and audio systems (e.g., radio, speaker phone). While some systems are linked to a premises (e.g., home HVAC) or an object (e.g., vehicle HVAC), some implementations support control of other systems, such as personal systems like a navigation system of a mobile communication device as the controllable system, for example.

II. APPARATUS COMPONENTS—FIG. 1

Now turning to the figures, and more particularly to the first figure, FIG. 1 illustrates schematically a block diagram showing components and functions of an apparatus, or system, according to the present technology.

The apparatus is referred generally in FIG. 1 by reference numeral 100. Apparatus components are described below, first generally, followed by more-detailed descriptions of the structure and constituent functions.

In one embodiment, the apparatus 100 is, in its entirety, a part of a vehicle, such as an automobile. In one embodiment, some or all of the apparatus is a part of a vehicle processing unit, such as an on-board computer (OBC) of the vehicle.

The apparatus 100 includes and/or is in communication with one or more sensors 102, which can also be referred to as user- or human-machine interfaces (UMI, HMI), for example. The sensors 102 in various embodiments can include one or more of a variety of sensing or input devices, such as microphones, cameras, light-based sensors (e.g., sensors using laser), buttons, knobs, touch-sensitive displays, and/or other touch-sensitive devices.

The apparatus 100 also includes a memory, or computer-readable medium 104, such as volatile medium, non-volatile medium, removable medium, and non-removable medium. The term computer-readable media and variants thereof, as used in the specification and claims, refer to tangible or non-transitory, computer-readable storage devices.

Any of the computing components described herein, including the memory, can be located outside of the vehicle in which the system or systems controlled (e.g., vehicle HVAC) is positioned. The memory 104 can be located in, for instance, a remote device, such as a server (a server-based memory), that is in communication with an on-board apparatus for adjusting the vehicle system (e.g., HVAC) according to the teachings herein. The remote device could be part of a remote customer-service center, such as the OnStar® customer service center.

In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The computer-readable medium 104 is part of a computing or processing device, apparatus, or system also including a processor 105 connected or connectable to the computer-readable medium 104 by way of a communication link 107, such as a wireless connection (by requisite hardware—e.g., transceiver(s)) or a wired connection—e.g., computer bus.

The processor 105 could be multiple processors, which could include distributed processors or parallel processors in a single machine or multiple machines. The processor 105 can be used in supporting a virtual processing environment. The processor 105 could include a state machine, application specific integrated circuit (ASIC), programmable gate array (PGA) including a Field PGA, or state machine. References herein to processor executing code or instructions to perform operations, acts, tasks, functions, steps, or the like, could include the processor 105 performing the operations directly and/or facilitating, directing, or cooperating with another device or component to perform the operations.

The computer-readable medium 104 includes computer-executable instructions, or code 106. The computer-executable instructions 106 are executable by the processor 105 to cause the processor, and thus the computing device, to perform any combination of the functions described in the present disclosure.

The computer-executable instructions 106 include code defining a suite of interaction features. The instructions 106 can be or form part of what can be referred to as a user- or human-machine interfaces (UMI, HMI) agent (UMIA, HMIA). The agent acts between the user(s) and at least one controllable vehicle system, such as the HVAC system, as described herein.

The computing device further comprises an input/output (I/O) device (not shown in detail), such as a wireless transceiver and/or a wired communication port. The processor 105, executing the instructions 106, sends and receives information, such as in the form of messages, signals, or packetized data, to and from other apparatus components, vehicle components, and in some implementations, one or more extra-vehicle communication networks (not shown in detail), such as dedicated short-range communications (DSRC), Wi-Fi, cellular, or satellite network for communicating with a remote system—e.g., a remote customer service center, such as the OnStar® customer service center.

The memory 104 also includes databases, or data stores, holding data used in performance of functions of the apparatus 100. The databases are accessed by the processor 105 executing the computer instructions 106. The databases or stores include a store 108 including data representing available system states. The memory 104 also includes a semantics dictionary, or semantics database 110. The dictionary or database can also be described as a semantics-dictionary database, a dictionary database, a dictionary store, a semantics store, or the like. And the memory 104 includes a user-model database 112, which can be referred to by other terms, such as a user model.

The available-system-states database 108 includes system states. A system state refers to a manner or manners by which the apparatus 100 is designed, such as by a system or system-component designer, e.g., engineer.

In one implementation, a state refers to all potential, or possible configurations of relevant controllable, or adjustable systems or sub-systems. Example systems or sub-systems include HVAC systems, audio systems, navigation systems or components, and autonomous- or semi-autonomous-driving systems.

While some systems are linked to a premises (e.g., home HVAC) or an object (e.g., vehicle HVAC), some implementations support control of other systems, such as personal systems like a navigation system of a mobile communication device as the controllable system, for example.

In some embodiments, more than one system can be controlled at the same time, or in connection with a common episode, regarding a determined user need, such as toward meeting a user need determined. For instance, if the apparatus determined that the HVAC is too loud to hear the radio, the HVAC and radio system may be adjusted accordingly (e.g., lower fan speed, increase radio volume) to meet the user need identified.

Regarding the HVAC system, for instance, system states include every possible HVAC setting, such as each fan speed selectable, each temperature setting, each humidity percentage setting, if applicable, whether the compressor is on or off, air delivery route (e.g., panel, legs), etc.

The available-system-states database 108 is a database of the memory 104 in which system states are arranged in a certain manner. In one embodiment, the database 108 includes system states arranged by application of operators—e.g., aggregation—on the system states.

The result is system states available as outputs covering an entire range of objective, potential system outputs that may be identified in performance of apparatus functions, and not covering only outputs determined by system states.

In other words, each physical system has a range of outputs that are possible to execute. Some user interfaces simplify their operation by showing the user discrete values of those systems. For example, a fan blower can require from the user an input level of low, medium, or high while the actual blower can produce fan output at power levels ranging from 0% to 100%—that is, the available system states in this example represent a continuous range of settings or values available, versus just the three discrete values presented to the user in usual course for such system.

For example, while an available state in which fan blower speed is set to 15% or 22% may be available physically by the blower, it may not be available by existing states that allow only, e.g., six (6) values for the fan speed—settings 1 through 6.

The semantic database 110 is in one embodiment a generally static database. In the embodiment, while the semantic database 110 is programmable, it is not adjusted in real time by the apparatus 100 during normal operation.

In one embodiment, the semantic database 110 is created and/or modified (by, e.g., a software update) to reflect semantic definitions or rules corresponding to interactions with at least one user. In most implementations, the semantic database 110 is created and/or modified to reflect semantic definitions or rules created based on interactions with many users.

The semantics database 110 includes data relating to communications that a user has or may make. Data in the semantics database 110 can be established based on past interactions with the user. Data in the semantics database 110 can also be set by a programmer, e.g., apparatus designer. The database 110 can include pre-set data that is pre-stored in a vehicle controls system before user purchase of the vehicle, or provided to the apparatus by an update.

The semantics database 110 also includes one or more interpretations mapped in the data to potential future communications, which can be taken from past user communications received at the apparatus or otherwise programmed into the apparatus, for instance. The communication types are not limited and can include, e.g., oral or verbal utterances, gestures, gazes, intonations, and manual inputs, such as button or screen presses, slides, etc.

Communications used in creating the semantics database 110 can be received and identified in any one or more of a wide variety of forums. Example forms include pre-manufacturing testing and/or by way of use of the apparatus on a present vehicle and/or one or more other vehicles.

The semantics database 110 is used to map the various communications identified to one or more underlying, matching precursors. The relationships can be referred to as semantics. The term precursor refers to the action(s) that the user really wants or would like, as indicated at least in part by their communication (e.g., utterance or gesture), even if they do not know what they would like, even if they do not know how to articulate it if they do know, and even if they do not know that they are articulating.

As referenced in the Background section, conventional systems do not allow users to adjust controllable systems (e.g., HVAC system) without knowing how they want them to be adjusted. A user may not know the difference, pros and cons, of using an 'economy mode' for an HVAC system at times versus a 'comfort mode' for the HVAC system at other times, or even that such modes exist. The present technology determines, based on user input, and in various embodiments ancillary input (e.g., context data 114, semantics database 110, user-model data 112), adjustments that would be optimal, or at least determined best or most appropriate under the circumstances.

The semantics database 110 can include data or code referring to, linked to, or configured to receive or be processed with context data. The context, which can also be referred to as ancillary data, can be received from, for example, schematic block 114 in the figures. Specific interpretation or mapping of a user input—such as a user utterance of "hot" can depend on context such as an inside temperature of the vehicle and/or an exterior temperature.

As another example, mapping can depend on how long the user has been in the vehicle. If a user has just entered the car, the inside temperature is over 100 degrees Fahrenheit, and the user says, "it is hot," then the semantics-dictionary data could, in association with context data (e.g., time in car, user schedule, user biometrics (sensed or stored), exterior temperature), lead to a determination, for instance, that fast cooling is needed by cold air pushed at high rate to the panel vents.

If on the other hand, the user has just entered the car, inside temperature is around 80 degrees Fahrenheit, and the user says, "it is hot," then the semantics data could, for example, in association with context data (e.g., time in car, user schedule, user biometrics (sensed or stored), interior temperature, exterior temperature), lead to a determination that while cooling is needed, cooling less aggressive than very cold air pushed at high rate to the panel vents would be appropriate, such as just relatively cool air pushed to multiple vents at a medium rate.

The apparatus can also include versions of such data, as with any of the semantics-database data, each being specific to a particular vehicle user, for instance, and so programmed into the user-model database 112 described next.

In some embodiments, the semantics database 110 includes semantics data relating to user personal state(s), such as temperament, mood, personality, attitude, or the like. The semantics database 110 can include data regarding a user being currently excited, nervous, demanding, etc. The database 110 can map communications—e.g., spoken utterances—in different ways depending on such personal-state factors. Again, the apparatus can also include versions of such factors, as with any of the semantics database data, each being specific to a particular vehicle user, and so programmed into the user-model database 112 described next.

The user-model database 112 is in one embodiment implemented according to a dynamic model. In the embodiment, the database 112 can be changed in performance of the processes of the present technology, in execution of the instructions 106, as shown by the return arrow (pointing to the module 106) in FIGS. 1 and 2 and described further below.

The user-model database 112 in various embodiments includes a personalized dictionary. The personalized dictionary can be like the semantics database 110 in ways, and the databases 110, 112 can work together. The user model 112 includes user-specific data, relating to an actual operator of a car, for instance. The data can include information about how a specific user communicates, such as how the user uses speech utterances.

The user-model database 112 includes a user profile and/or user preference(s), for at least one user of the vehicle. Data corresponding to a particular user can be configured in any of a variety of ways, including by being based on past behavior, user-set preferences or favorites, or default settings until changed, for instance. These datum can be referred to collectively as a user profile for simplicity, regardless of the structure in which the data is stored in the database 112.

The apparatus 100 may determine, or be programmed with data representing, for instance, that when a first vehicle user—e.g., Linda—says that it "seems hot" in the car, she means that it "seems extremely hot" in the car. The same database may include a user profile/preferences regarding another user as well—e.g., John. The user data in the user-model database 112 for him may indicate that when he says that it "seems hot" in the car, he generally means that it "seems a bit warm" in the car, and that when it is extremely hot in the car he is more likely to say then that it is "very hot."

The user specific data of the user model 112 can be modified by user input, setting user preferences or favorites. The data can also be determined through use of the apparatus. The apparatus may determine, for instance, that after saying that it is "hot" in the car, Linda appears satisfied thereafter only when the temperature is dropped by 10 degrees or more, leading to the conclusion that by saying "hot" she meant that it was to her "very hot" at the time. She can also set preferences of the user-model database 112 so that saying "hot" causes the apparatus 100 to lower the temperature 10 degrees, for instance.

As another example user preference, settable by the apparatus or user input, the data of the model 112 can indicate that the user is sensitive to noise, such as HVAC fan noise. This may be due to audible sensitivity or that the user is often or at a certain time using a hands-free telephone. When the setting is active or applicable, the apparatus will ensure that the HVAC adjustments will be made to ensure the fan is not raised to an over-loud level—e.g., not to or above a level 4 out of 10. Such preferences or sensitivities, when relating to a large number of people can also or instead be represented in data of the semantics database 110.

Such preferences or sensitivities can, again, along with being user specific, be established and maintained for more than one user per vehicle. User data can be established in any of a variety of ways, including by being set by an apparatus designer or other person updating the apparatus, the apparatus in operation (e.g., the apparatus processing user input or in apparatus learning), or the apparatus receiving user preferences otherwise.

As an example execution of various preferences or sensitivities, a hypothetical considers a first user, Linda, and a second, John. The apparatus can require, based on the respective user data for the users, that when Linda says, "increase fan speed," "turn up fan," "fan up," "more fan," etc., she desires, prefers, would like, or needs increase by two levels or units, while the same utterance from John means that he would like the fan turned up only one level or unit.

While the basis/bases for the apparatus 100 determining that a system adjustment (e.g., increase HVAC system humidity by 5%) would, under the circumstances, apparently be appropriate can include any of numerous relevant factors, indicated directly or indirectly by the user communication, such as user need, user desire, user preferences, what the user would appreciate or enjoy, etc., the basis or bases can be referred to generally as user need. Use of the phrase, user need, herein, then, including in the appended claims, is thus not made in a limiting sense—such as referring to a necessary or required condition to be satisfied, or such as excluding simple desires or recommended system changes for comfort—but rather broadly to incorporate any of the many bases, indicated directly or indirectly by the user communication, available to the apparatus for consideration according to the various embodiments of the present technology.

As provided, data described above in connection with the semantics database 110 can be represented by a user-specific version in the user model 112. The user-model database 112 can include data mapping input that a particular user may provide, and certain conditions may be provided (e.g., the user has just entered the car, the inside temperature is around 80 degrees Fahrenheit, and the user says, "it is hot,") to a certain outcome, while mapping such input provided by another user under the same conditions to a different outcome, based on the user-specific data programmed into the user model 112.

The personal data of the user model 112 can include data specific to a particular user's personal state—e.g., temperament, mood, personality, attitude, or the like. The user-model database 112 can include data regarding the user being currently excited, nervous, demanding, etc., and map communications from the particular user in different ways depending on such personal-state factors.

As referenced above, the apparatus 100 can include and/or be in communication with one or more other context components, represented generally in FIG. 1 by reference numeral 114. While a context component 114 is shown separately, some or all of the characteristics described herein in connection with the component 114 can reside within, or be performed instead by another apparatus component, such as the semantics database 110.

The context information in some embodiments includes input to the processor 105 from any of one or more interior or exterior vehicle sensors.

The context information can include, for instance, data indicating a state of the world or environment, such as at, proximate, near, or adjacent to the system(s) to be adjusted, such as an ambient, outside-of-vehicle temperature. The context data can also include other factors affecting the system to be controlled and/or the user, such an amount of time that the user has been in a vehicle for which the HVAC is being adjusted. Other example context data include a user schedule, which can be obtained from a calendar program in the vehicle or user mobile device, for instance, and user biometrics, whether sensed by vehicle sensors or stored, or other user-specific characteristics. Also, viewing FIG. 1, the sensors 102 can be configured and arranged to provide information about an ambient environment.

The context component 114 can provide context information in real time for use by the processor 105 in executing the instructions 106, such as by a regular feed (push function) or the component 114 can store such information for being provided to or accessed (pull function) by the processor 105 selectively.

FIG. 1 also shows vehicle output system, devices or components schematically by reference numeral 116. The output systems 116 can include any of a wide variety of controllable vehicle systems without departing from the scope of the present technology. Example output systems 116 include HVAC systems, navigation systems or components, controllable vehicle-suspension systems, audio systems (e.g., radio, speaker phone), and autonomous or semi-autonomous driving (e.g., automatic cruise control) systems.

In some embodiments, as mentioned, more than one system can be controlled toward at the same time, or in connection with a common episode, regarding a determined user need, such as toward meeting a user need determined. For instance, if the apparatus determined that the HVAC is too loud to hear the radio, the HVAC and radio system may be adjusted accordingly (e.g., lower fan speed, increase radio volume) to meet the user need identified.

III. APPARATUS FUNCTIONS—FIG. 2

III.A. Introduction to Functions

The computer-executable instructions 106 include computer code for performing functions of the present technology as mentioned. The instructions 106 include code defining a suite of interacting, or interaction, features. The instructions include, more particularly, code defining or being a part of a user- or human-machine interfaces (UMI, HMI) agent (UMIA, HMIA). HMI agent functions include processing input received from the sensors 102 (including user input) and any separate or additional context 114, other code (e.g., 108, 110, 112), and vehicle from other vehicle components 116.

FIG. 2 shows the apparatus 100 of FIG. 1 with the computer-readable instructions 106 expanded in a manner showing functions performed by the processor 105 executing various modules 202, 204, 206, 208, 210 of the instructions 106. Although the functions are performed by the processor 105, the functions are shown, for simplicity, schematically as being performed at the modules 202, 204, 206, 208, 210 of the instructions. For convenience of the reader, the relationship is sometimes repeated below—i.e., while functions are shown and at times described as being performed at or by a module, the processor 105 performs the functions executing code of the module.

Any one or more of the functions, or operations thereof, can constitute a distinct method or process within the scope of the present technology. The illustrated flow can represent one or more algorithms, defined by the code 106. It should be understood that the steps of the method are not necessarily presented in any particular order and that performance of some or all the steps in an alternative order is possible and is contemplated.

The steps have been presented in the demonstrated order for ease of description and illustration. Steps can be added, omitted and/or performed simultaneously without departing from the scope of the appended claims. It should also be understood that the illustrated method can be ended at any time. In certain embodiments, some or all steps of this process, and/or substantially equivalent steps are performed by execution of computer-readable instructions stored or included on a computer readable medium, such as the memory 104 of the computing device described.

The function modules include an interpretation module 202, an analysis module 204, a goal-recognizer module 206, or simply, goal recognizer, a translation module 208, and an execution module 210.

While these are shown separately, and the functions of each are described below in turn, it should be appreciated that any two or more modules can be combined and any one may be divided. In this way, functions or operations described as being performed by a single module may be performed instead by more than one module, and functions described as being performed by two or more modules can be performed in another implementation by less modules (e.g., one module).

Any one or more of the modules 202, 204, 206, 208, 210 can be configured to include artificial intelligence—e.g., machine learning. The analysis module 204, can learn through its operations, for example, and thus improve itself for better performance in future operations. The learning can include feeding back data to the user-model database 112, such as data regarding relationships between input features 230 and determined output 238. The learning process can also be referred to as a feedback-based learning process, including feedback-based learning functions III.B. Interpretation Module The interpretation module 202 includes instructions for performing up-front processing of various inputs. The inputs can include one or more communication inputs 220 received from a user 222. The input can include one or more signals, messages, and/or data received in any format.

A communication underlying a communication input(s), or an underlying communication, may include an audible communication 224, for instance, such as a spoken utterance, a hand clap, finger snap, laughter, a sigh, etc.

More particularly, the communication inputs 226 are received at the interpretation module (again, the processor 105 executing code of the module, e.g.) from one or more vehicle sensors or interfaces 102. The sensors or interfaces 102 sense user action or interactions with the vehicle. The input can represent communications from any user, including the vehicle operator or any vehicle passenger.

The sensors can, as mentioned, include one or more microphones, cameras, light-based sensors (e.g., sensors using laser), buttons, knobs, touch-sensitive displays, and/or other touch-sensitive devices.

Regarding camera interface(s), other example underlying communications can include user gestures or other movement, such as waving a hand, moving (e.g., tilting or nodding) a head, moving a gaze of the eyes.

Regarding touch-sensitive interface(s), other example underlying communications can include or result from soft-button selection, sliding, or other on-screen or on-device gestures, touches, or actions.

The interpretation module 202 can also receive as input, context input 228, as also shown. Although the context input 228 is shown separately in FIGS. 1 and 2, the input 226 from the sensors 102 can include contextual information as mentioned above. The context or contextual information can include, e.g., vehicle cabin temperature, outside-of-vehicle temperature, humidity level in or outside of the vehicle, sound levels, vehicle component operation characteristics, such as an amount of voltage being used in the vehicle or by a sub-system thereof, vehicle RPMs, etc.

In one embodiment, the interpretation module 202 converts some or all input from at least one received format or language to at least one other converted format or language. For instance, an input format is converted to a pre-set language, or a first language is converted to a pre-set second language. The process may be referred to as mapping, for example, mapping the relevant received-format input to the converted format. The balance of the apparatus (e.g., modules 204, 206, etc.) or parts thereof can be configured to use the resulting format or language in subsequent functions.

As an example, the interpretation module 202 converts input 226, received from a sensor 102 and indicating that the user is waving a hand in front of his or her face like a fan, to language, such as, "it is hot."

As an example of altering language, the implementation module 202 could convert an input of "whoa, it's hot!" to a more objective or simpler corresponding phrase, such as "very hot," "it is too hot," or just "too hot" or "hot."

In a contemplated embodiment, the interpretation module 202 translates to a base language, such as English, words received in another language, such as German, Mandarin, etc.

In one embodiment, the interpretation module 202 filters the input 226 and/or the context input 228. As referenced, some or all of the input 226/228 can be mapped to a pre-set format or language. In a particular embodiment, the module 202 filters the communication input by identifying, or selecting relevant features, aspects, or characteristics of the communication input.

In a contemplated embodiment, the apparatus is configured to determine who in a vehicle provided an input—e.g., driver vs. rear seat passenger—or the particular person—e.g., user, Linda, or user, John. In various embodiments, the determining includes, for instance, proximity measurements (radar, sound level). In embodiments, the determination includes biometric evaluation, such as voice analysis, other sound analysis, facial recognition, etc.

The apparatus in embodiments uses in various ways the determination in apparatus processing. The apparatus could, for instance, assign more weight to a driver input than a passenger input. As another example, the apparatus could determine to adjust a rear-of-vehicle compartment temperature instead of a front-of-vehicle component temperature if an utterance (e.g., complaint or instruction) is received from only a rear passenger. As still another example, the apparatus could determine to, while adjusting the environment of the front and rear portion of the vehicle, or of the entirety of the vehicle, adjust the environment more in the rear.

The result of the filtering of the interpretation module 202 can be represented in any of a variety of ways. In one embodiment, the HMI code or instructions 106, using the relevant data (e.g., the illustrated data inputs 226, 228 to the interpretation module 202), are configured so that the resulting output 230, reached by execution of the instructions 106, is represented as a data vector.

Output 230 of the interpretation module 202 can be referred to as interpretation output, interpretation-module output, initial-processing output 230, like terms, or other.

The output 230, in vector format, e.g., is passed on to the analysis module 204, etc., for further processing. Downstream functions, using the output 230, include analysis to identify underlying user intention, desire, need, or preference, which can be referred to as a precursor.

As provided above in more detail, no matter the basis driving a system adjustment (e.g., user need, want, comfort, etc.), the basis can be referred to generally as user need, and use of the phrase herein, including in the appended claims is made not in a limiting sense, but broadly to incorporate any of the many bases, indicated directly or indirectly by the user communication, available to the apparatus for consideration according to the various embodiments of the present technology.

III.C. Analysis Module

The analysis module 204 receives the interpretation-module output 230 (i.e., again, the processor 105 executing code of the module 204). The output 230 can in part or in full have been formatted and/or filtered by operation of the interpretation module 202, as mentioned. The module 204 can also be referred to as a rule-based engine.

The analysis module 204 analyzes the interpretation-module output 230 to identify apparent intentions or desires of the user. The intentions, desires, needs, or preferences can be referred to as precursors.

Deriving the precursors includes evaluating at least one piece of user-communication input 226, such as would be represented in the interpretation-module output 230. The derivation may also then include evaluating any distinct context information 228 represented in the output 230, or as can be received from the context source(s) 114, such as by context-data path 232.

As also shown in FIG. 2, input to the analysis module 204 can also include that of the user model 112 and/or the semantics database 110.

The analysis module 204 can be configured to consider in the derivation any of a wide variety of aspects of the user input 226, context input 228/232, user-model input 236, and/or semantic database input 234.

These aspects considered can include, e.g., aspects indicating a mental state, emotional state, or otherwise a condition or intention or desire of the user, such as excitement, frustration, etc. Repetition, for instance, can indicate frustration or high emotion, such as when a user presses a soft-key more than once in a row when only one press is needed, or when a user waves or otherwise gestures two or more times.

As other, contemplated, examples of the communication characteristics that can be used in the analysis, include intonation, volume, or other discernable degree of communication. Such characteristics can indicate, for example, frustration, or high emotion, such as when a user speaks an instruction or other communication loudly, or when the user presses a soft-key or button with much more force than is needed, or more force than is usual for the user or an average user.

In one embodiment, the analysis module 204 considers user-specific data and/or data created based on experience or experiments involving many subject users. The data can include user preferences or settings, or data indicating past experiences with the user and/or other users can be referred to as a rule-based engine. The data could be received from any of various locations at which it could reside, such as the user-model database 112.

The analysis module 204, for its functions, includes correlations, or linking rules, between inputs (e.g., user input 226 represented in the interpretation output 230) and one or more likely precursors. The analysis module 204 can likewise include correlations between multiple inputs and one or more likely precursors. The analysis module 204 can also include or consider non-user inputs, such context data 232—e.g., ambient temperature, input 234 from the semantics database 110, and/or input 236 from the user-model database 112.

The analysis module 204 in some embodiments also updates the user-model database 112, as indicated in FIG. 2 by the return arrow 240 from the module 204 to the database 112. This can be done, e.g., by tracking user reactions to results of the apparatus analysis. For instance, the apparatus can track a user's reaction to an initial system adjustment (e.g., temperature drop) made based on an initial precursor determined, and use the reaction feedback in later analyses.

The feedback can indicate, e.g., that the initial precursor determined (e.g., lower temperature needed) in response to a user utterance of "ugh" when entering an 80 degree Fahrenheit (F) in-cabin temperature, was accurate and so relate, or relate to a higher degree (stronger connection for predicting), such input ("ugh", or the utterance in connection with the environmental condition) with the same precursor in connection with a vehicle user or a particular vehicle user who made the utterance and was identified.

To the contrary, if the system determines in the tracking that the user does not seem fully satisfied with the initial precursor determined (i.e., with the resulting system output), the correlation can be removed or weakened for use in future analyses by the module 204. The correlation could also, instead, be replaced with another relationship, such as a link to what the apparatus determines after the initial iteration that the user actually desired.

The analysis module 204 outputs the resulting precursors as analysis output 238. The analysis output 238, like all terms used herein, may be referred to by other terms. The analysis output 238 is received at the goal-recognizer module 206.

As provided, any one or more of the modules 202, 204, 206, 208, 210 can be configured to include artificial intelligence. The goal-recognizer module 206 in embodiments, learns during its operations, and thus improve itself for better performance in future operations. In embodiments in which the analysis module 204 provides feedback to the user-model database 112, data path 240, the feedback 240 can include results of analysis. Example results of analysis include relationships determined between input (user input, contextual data, etc.), to the module 204 and determined results—e.g., precursor(s)). The feedback can be a part of the learning. The learning implemented by the module 204 can, as mentioned, be a type of artificial intelligence—e.g., machine learning. The learning process can as mentioned be referred to as a feedback-based learning process, including feedback-based learning functions.

As an example, a rule-based arrangement can be developed based on past experiences, with a particular user and/or other users. If for each of one or more circumstances for (i) a certain contextual setting (e.g., time of day and/or cabin temperature), (ii) a user says, "very hot," (iii) the HMI agent increased the current fan by one speed setting, (iv) and the user was not happy (as determinable by, e.g., subsequent utterances and/or gestures of the user, or manual control of the HVAC), then the apparatus could update itself automatically in response so that the same circumstances ((i) and (ii)) are mapped, by new or adjusted rule, instead then to a different, e.g., more aggressive, HMI action—e.g., increasing fan speed by two units.

As another example, if the apparatus determines (e.g., by user feedback and/or subsequent user action—e.g., turning up the radio volume) that a certain fan setting and air delivery channel (e.g., dash vent(s)) is too loud, then the apparatus would automatically update the mapping by new or adjusted rule that (i) avoids increasing the blower for air delivered to the dash vents(s) (perhaps just lowering temperature more), (ii) delivering all or at least more air, at whatever fan level deemed appropriate considering the climate and sound context (e.g., radio playing, talk radio show or talk-show channel on) or desires, by other channels (e.g., via floor vents), and/or (iii) increases radio volume, for instance.

In one embodiment, a new or adjusted rule is stored when a level of confidence that the rule is accurate is above a threshold level. In a particular embodiment, confidence level can be maintained as a percentage. Confidence in a rule could be defined or indicated by a number of times the same case occurred out of the total number of interactions with the HVAC with the same user. In one implementation, a new or adjusted rule is stored when the confidence is at least 50%—i.e., more likely than not that the rule is true, or accurate. It should be appreciated that a replacing rule, or a reversing adjustment, can be stored subsequently if sufficient data to support a rule change (e.g., a potential rule supported by greater than 50% confidence) is present.

The functions of the analysis module 204 and/or the recognizer module 206 can be referred to generally as containing, or understanding actual user desires and intentions. The resulting, personalized, user experience can be referred to then as a contained experience.

The containing can be performed based on implied or implicit indications, e.g., communications, received from one or more users, such as utterances and gestures. The implied indications in many implementations differ from actual, or explicit, communications of the user, such as button presses, express commands (e.g., "cool 5 degrees F."), etc. The containment can also include, as provided, consideration of any of the described contextual data, user model data, semantics database data, available system data, and current system settings data.

III.D. Goal-Recognizer Module

The user- or human-machine interfaces (UMI, HMI) agent (UMIA, HMIA) 106 also includes a goal-recognizer module 206, which may be referred to simply as a goal recognizer, recognizer, GR module, GR, or the like.

In operation, the goal-recognizer module 206 (e.g., the processor executing instructions of the module 206) uses the user precursor(s) determined and received via route 238, to determine one or more corresponding goals to be implemented at the vehicle.

In various embodiments, the goal recognizer 206, in determining the goals corresponding to the determined precursor(s) 238 considers, in addition to the precursors(s) 238, ancillary data including any separate context data 242 from the context source 114, system states data 244 received from the system states database 208, and/or vehicle systems feedback or data 246 (e.g., current system states) from the vehicle systems 116.

The context data 242 can be same or generally same as the data 232 provided to the interpretation module 202 and/or to the analysis module 204, or processed and passed on by the analysis module 204.

In one embodiment, the recognizer 206 also uses data 244 indicating the available system states, from the available-system-states database 108, to determine the resulting goal(s). The goal(s) can include a recommended system state or states.

In FIG. 2, whether available-system-states data 254 is used, the output, or goal, from the recognizer 206, is shown by the data path 247 extending from the module 206 to the next downstream module 208.

The resulting goal can be referred to also as subjective system output or command, and indicates the system operation(s) or state(s) (e.g., HVAC setting or state), or system adjustment(s) (e.g., change to HVAC system), that the HMI 106 has determined needed, e.g., desired consciously or subconsciously by one or more users.

Generally, the subjective system output 247 represents what the user would like changed (e.g., fresher air), even if they do not know how to request the system adjustment (e.g., by utterance or gesture), or even if they do not know that they requested—e.g., cycling of cooler air at a relatively-high blower speed.

As provided, any one or more of the modules 202, 204, 206, 208, 210 can be configured to include artificial intelligence. The goal-recognizer module 206 can, for example, learn during its operations, and thus improve itself for better performance in future operations.

The goal-recognizer module 206 can receive available-system-state data via data path 244, as mentioned. In one embodiment, the goal-recognizer module 206 provides feedback to the available-system-states database 108, as indicated by the path 244 shown. The feedback can include results of module functions, such as relationships determined between input (precursor, contextual data, etc.), and determined results (e.g., subjective system output(s)).

The feedback can be a part of the learning. The learning implemented by the module 206 can, as mentioned, be a type of artificial intelligence—e.g., machine learning. The learning process can as mentioned be referred to as a feedback-based learning process, including feedback-based learning functions.

In an example operation, the goal-recognizer module 206 sends a query to the available-states database 108. The query in some implementations includes information that the goal-recognizer module 206 has about current state (e.g., current HVAC state; indicated by, e.g., the current system signal 246), information from the precursor 238, and perhaps context data 242. In response to the query, the goal-recognizer module 206 receives in return from the available-systems database 108, a goal state for the system(s) (e.g., HVAC).

As referenced, above, the functions of the analysis module 204 and/or the recognizer module 206 can be referred to generally as containing, or understanding actual user desires and intentions. The containment can be performed based on implied or implicit indications, e.g., communications, received from one or more users, including utterances and gestures. The implied indications in many implementations differ from actual, or explicit, communications of the user, such as button presses, express commands (e.g., "cool 5 degrees F."), etc. The containment can also include, as provided, analysis of any of the described contextual data (e.g., 232, 242), user-model data (e.g., 236, semantics database data (e.g., 234), available-system data (e.g., 244), and current-system-settings data (e.g., 246).

III.E. Translation Module

The user- or human-machine interfaces (UMI, HMI) agent (UMIA, HMIA) 106 also includes a translation module 208. The translation module 208 can be referred to by other names, such as translate module, translator module, translator, etc.

In operation, the translation module 208 (e.g., the processor 105 executing the computer-executable code of the module 208) determines or identifies one or more system commands 248, or objective system output, code, or instructions 248, that would be used at the vehicle (e.g., at the HVAC system, or NAV system) to implement the goals 247, or subjective system output or command, recognized by the previous module 206. The outputs 248 may also include and be referred to as HMI system commands.

For a given goal 247, e.g., the translation module 208 determines one or more objective system-state outputs 248.

In various embodiments, the translator 208, in determining the objective system command 248, considers, in addition to the subjective system output or command 247, any separate context data 250 from the context source 114 and/or system-states data 252 received from the system-states database 208, and/or vehicle systems feedback or data 246 (e.g., current system states) from the vehicle systems 116.

The available-system-states data 244, of the available-system-states database 108 and available to modules 206, 208 as shown, can indicate all potential, or possible settings or operation values for the system(s) 116. The available-system-states data 244 can include an entire range (e.g., 0-100%) of blower fan speeds, for instance, which allows much finer tuning compared to conventional fan settings presented—e.g., dashboard display knob for fan speed values of low, medium high, or levels 1 through 4.

The context data 250 can be same or generally same as the data 232 provided to preceding modules (202, 204, and/or 206), or as processed and/or just passed on by any one or more of those modules. In various implementations, as with each primary function module (e.g., 202, 204, 206, 208, 210), the context data can be received or processed by the translator 208 directly from the database 114, e.g., without the data 114 passing through other modules.

The objective system command 248 in some embodiments includes raw representations of appropriate outputs (e.g., physical outputs) to be implemented at the system 116. The output 248 can indicate one or more system 116 settings of the entire range(s) mentioned (e.g., a setting from 0-100% of blower fan speeds), which is more accurate than conventional settings presented to a user—e.g., fan speed values of low, medium high.

As provided, any one or more of the modules 202, 204, 206, 208, 210 can be configured to include artificial intelligence. The goal-recognizer module 206 can, e.g., learn during its operations, and thus improve itself for better performance in future operations.

In one embodiment, the translation module 208 provides feedback to the available-states database 108, as indicated by data path 254. The feedback can include results of module functions, such as relationships determined between input to the translation module 208 (subjective system output 246, contextual data 150, etc.), and determined results—e.g., objective system command(s) and subsequent user communication (after the objective system command is executed at the system(s) 116).

The feedback can be a part of the learning referenced. The learning implemented by the translator module 208, can be a type of artificial intelligence—e.g., machine learning. And the learning process can as mentioned be referred to as a feedback-based learning process, including feedback-based learning functions.

In an example functioning, the translator module 208 sends a query to the available-states database 108 asking for a state corresponding to a current goal (e.g., a goal received from the goal-recognizer module 206) and receives, in response, the target current state.

III.F. Execution Module

The execution module 210, present in some implementations, receives the objective system command 248—e.g., HMI-vehicle commands, generated by the translator module 208.

In operation, execution module 210 (e.g., the processor 105 executing code of execution module 210) performs on the commands 248 any final processing. The final processing could include any relevant processing, such as, formatting, translation, conversions, etc., needed before the commands are sent 256 to be implemented at the appropriate vehicle system(s) 116.

III.G. Recommendation or Automatic Actions

The user- or human-machine interfaces (UMI, HMI) agent (UMIA, HMIA) 106 is in a contemplated embodiment configured to recommend or pursue automatically a specific adjustment for a system (e.g., HVAC or NAV system) under circumstances detected that match previous circumstances under which the user provided a communication 222 indicative of the specific system adjustment.

For example, when a user provides a communication 224 in connection with certain circumstances (e.g., cabin temperature and air flow state, or road quality (e.g., bumpy road segments), the HMI 106 can store the conditions in connection with the input 224, or at least with the action (e.g., 256) taken, for later use. The HMI 106 can then recommend the action, notify the user that the action will be taken (or taken absent other instruction), or just take he action, in response to the HMI 106 determining that the same or similar conditions are present.

The HMI can also in the contemplated embodiment, set the type of recommendation or decision as a user setting or preference, in the user-model database 112, for example, for later automatic presentation or implementation. The setting, in various implementations, can be, for instance, established in response to user approval or by user request.

IV. EXAMPLE IMPLEMENTATIONS

The destination vehicle system 116 for the system commands 256 generated can include any automatically controllable system of the vehicle. As mentioned, these can include an HVAC system, a navigation system, autonomous or semi-autonomous driving (e.g., automatic cruise control) systems, electronically-controllable vehicle-suspension system, and audio systems (e.g., radio, speaker phone). Example embodiments directed to such systems are described in the following sections.

IV.A. Heating, Ventilating and Air Conditioning System

The exemplary implementation with an HVAC system as the subject system 116 is now described further.

HVAC systems represent another system 116 [e.g., a premises- (e.g., home- or hotel-), or object- (e.g., vehicle-) based system] that can be controlled in a personal manner for a user(s) based on user communications 224, including indirect communications—e.g., utterance and/or gestures, alone or in combination with context data, semantics-database data, user model or settings/preferences data, and systems data.

The present technology allows adjustments of HVAC parameters to improve or maintain user comfort. The adjustments are in some embodiments performed continuously, or on generally an ongoing basis. The adjustments are in some embodiments performed automatically, or performed in response to election after a recommendation from the apparatus 100. The adjustments are in some embodiments performed following a notification of the planned adjustment, such as automatically, or after the notification and absent the user communicating objection with the planned adjustment indicated by the notification.

The flow of FIG. 2 is now explained further by way of example with reference to an HVAC system. In the example, a user 222 provides a user communication 224 in a form of an utterance: "it is stifling!" or "whoa, it's hot in here!"

The communication 224 is sensed by a sensor 102, such as a microphone. A signal 226 corresponding to the sensed communication is received by the human-machine interface (HMI) 106—e.g., received by a processor of a computing unit, such as the referenced on-board computer (OBC) of the vehicle, executing code of the HMI 106. The input 226 can be received, more particularly, at the interpretation module 202 of the HMI 106.

Another input to the interpretation module 202 of the HMI 106 can include context data 228. Example context data 228 indicates current cabin temperature, current output path for HVAC air (e.g., air to panel), or current fan power or blower level—e.g., 30%. In one embodiment, such ancillary data (current cabin temperature or current fan power or blower level) is provided, instead or in addition, to the HMI 106 via path 246, and considered by the associated, receiving module(s)—e.g., goal-recognizer and/or translation module 206, 208.

As referenced in an earlier example, the interpretation module 202 converts or maps input 226, received from the sensor 102, to a description or indicator of substance of the input 226. For example, the interpretation module 202 maps communication input 226 indicating that the user is waving a hand in front of his or her face like a fan, to language, such as, "it is hot," or "hot, or other indication of temperature being too high.

The module 202 in various embodiments evaluates a subjective verbal input 226, such as, "it is stifling!" or "whoa!", and any context data, to determine a more-objective phrasing of the input 226, such as "it is very hot" or just "very hot."

As provided, the interpretation module 202 in a contemplated embodiment converts to a base language, e.g., English, words received in another language—e.g., German, Mandarin, etc.

Output 230 of the interpretation module 202 is passed to the analysis module 204. The output 230 can be represented in any of a variety of ways, including as a data vector.

The analysis module 204 processes the input 230 (e.g., "too hot") alone or along with any one or more of a contextual input(s) 232 (e.g., cabin temperature), user-model-database input(s) 236, and semantics-dictionary database input 234, to produce an apparent intention or desire of the particular user/users 222 who provided the communication 224.

The result 238 of the analysis module 204 processing in this example can be, e.g., that the user wants stronger fan and decreased temperature. Again, the result 238 can be referred to as the precursor.

The precursor 238 is then used by the goal-recognizer module 206. The goal recognizer 206 uses the output 238 alone or along with any one or more of a contextual input(s) 242 (e.g., cabin temperature) and available system states data 244 received from the system-states-database 108, and vehicle systems feedback or data 246 (e.g., current system states) from vehicle systems 116 (e.g., HVAC system).

The resulting goal 247, which can be referred to also as subjective system output, represents what the HMI 106 has determined is the system operation or state (e.g., HVAC setting(s) or state(s)), or system adjustment (e.g., change to HVAC system), needed, preferred, or desired consciously or subconsciously by one or more users.

In the present HVAC example, the subjective system output 247 can include, e.g., increase fan power to 50% and decrease target temperature 5 degrees F.

The translation module 208 converts the subjective system output 247, with or without other inputs—e.g., one or more of a contextual input(s) 242 (e.g., cabin temperature) and available system states 108, system states data 244 received from the system states database 208, and vehicle systems feedback or data 246 (e.g., current system states) from the vehicle systems 116 (e.g., HVAC system)—to system commands, or more-objective system output 248.

The objective system command 248 represents system commands—e.g., computer-executable or device-executable instructions corresponding to the subjective system output 247—that can be executed at the HVAC system 116 or for the purpose of controlling the HVAC system 116.

The system commands 248 can include, in the example, code or other signal or instruction instructing the vehicle systems 116 to set the fan to a certain level, e.g., level 4 (from level 2, previously), and set the temperature to a certain temperature, e.g., 22 degrees Celsius (C) (from 27 degree C., previously).

The execution module 210 represents any execution code helpful for executing the system commands 248. The execution may include generating final instructions or signals 256 configured to cause the relevant vehicle system(s) 116 to adjust accordingly.

To illustrate the iterative aspects of the present technology, the example can further include, after increasing an HVAC fan (e.g., to level 4) and decreasing the temperature (e.g., down to 22 degrees C.), receiving subsequent user input 224, such as, an utterance of "ugh . . . still hot, but more air will disturb my face," or "ugh . . . still hot, but air already blasting."

The interpretation module 202 converts the corresponding new input 226, alone or with the context information 228, to an output 230 representing what is believed to be a subsequent output 230 determined to be an essence of what the user expressed (by utterance, gesture, etc.).

In this subsequent iteration of the process, the interpretation module 202 output can include, "too hot, more air would be disturbing," "too hot, not more air," "too hot and too much air," or the like.

With the output 230, and any of the other input described and shown for the analysis module, the module 204 determines what the user is apparently seeking. This subsequent result 238 can be referred to as the second, or subsequent precursor. In this example, the result 238 may indicate that the user apparently wants cooler air, but less air flow—e.g., less air on his face.

With the output 238, and any of the other input described and shown for the goal recognizer 206, the module 206 then determines a subsequent subjective system output 247, such as set fan power to 60%, change air delivery to floor+panel.

The translation module 208 converts the subsequent subjective system output 248 to objective system command 248, as described (e.g., with context and/or system state inputs 250/252), for execution via the execution module 210.

As provided, any one or more of the modules 202, 204, 206, 208, 210 can be configured to include artificial intelligence. The analysis module 204, e.g., can learn during its operations, and thus improve itself for better performance in future operations.

Feeding back data (e.g., relationships between input features 230 and determined output 238) to the user-model database 112 can be a part of the learning. The learning implemented by the module 204 can, as mentioned, be a type of artificial intelligence—e.g., machine learning.

The learning functions are referenced further before. In the example iteration described, the HMI 106 may cause to be stored data—stored to the user model and/or semantics databases 112, 110, for instance—representing one or more connections between (A) the initial user communication 224 (e.g., "it is stifling!" or "whoa!"), and any other inputs (e.g., contextual) and, instead of the initial outputs determined 238, 247, 248, 256, (B) the subsequently determined effective (e.g., because no further relevant user communications (complaints or relevant gestures)) outputs 238, 247, 248, 256 (e.g., set fan power to 60%, change air delivery to floor+panel), 248. The relationship can then be used for more effective, express, personalized HVAC system adjustment in future operation.

As provided, the HMI 106 is in a contemplated embodiment configured to recommend or pursue a specific system (e.g., HVAC system) adjustment under circumstances detected that match previous circumstances under which the user provided a communication 222 indicative of the specific system adjustment. In this case, the HMI 106 can later recommend the subsequent action taken (e.g., set fan power to 60%, change air delivery to floor+panel), or just state that the action will be taken (or without user instruction otherwise), in response to the HMI 106 determining present the conditions (e.g., context data) that were present when the user previously made the related communication 224 (e.g., "it is stifling!" or "whoa, it's hot in here!"). The HMI can also set this type of decision as a user setting or preference (in, e.g., the user-model database 112) for later automatic implementation, such as with user approval, lack of objection, or by user request.

IV.B. Navigation System

The exemplary implementation with a navigation system as the subject system 116 is now described further.

As provided, navigation systems represent another system 116 [e.g., a personal- (e.g., mobile-communication-device-), premises- (e.g., home- or hotel-), or object- (e.g., vehicle-) based system 116] that can be controlled in a personal manner for a user(s) based on user communications 224, including indirect communications—e.g., utterance and/or gestures, alone or in combination with context data, semantics-database data, user model or settings/preferences data, and systems data.

Many modern navigation systems can be set to speak directions to the operator. In an example, the operator is being provided directions, and possibly repeatedly, in this way while they already know where they are going, such as to their home. An example input 224 of a user 222 in this navigation system scenario can include, then, "I know my way home, why are you repeating this?"

The HMI 106 processing described, including all or any aspects shown in FIG. 2, for instance, can be performed to identify a precursor 238 of, e.g., "I don't want to receive directions so often," "I don't want directions to my house once I get to this close proximity," or the like.

The processing can also then result in a subjective system output 247 of, adjust timing and content of messages in this scenario (e.g., traveling home and at this proximity). The command 247 is converted to an objective command 248, stored for later implementation (e.g., to the available system states and possibly also or instead to the semantics and/or user-model databases), and executed via the execution module 210 as needed for adjusting the NAV system 116.

As provided, the HMI 106 is in a contemplated embodiment configured to recommend or pursue a specific system (e.g., NAV system) adjustment under circumstances detected that match previous circumstances under which the user provided a communication 222 indicative of the specific system adjustment. In this case, the HMI 106 can later recommend that the direction recitals stop, or just state that the direction recitals will stop, in response to the HMI 106 determining that the same or similar conditions are present—e.g., at or near the same proximity to home. Automatically or with user approval, based on the setting made previously, the HMI 106 then executes the suggested action. The HMI can also set this type of decision as a user setting or preference (in e.g., the user-model database 112) for later automatic implementation, such as with user approval or by user request.

As another NAV system example, the user 222 may state 224 that there are "too many road bumps on this road!" The HMI 106 processing described, including all or any aspects shown in FIG. 2, for instance, can be performed to identify a precursor 238 of, e.g., "I do not want to drive on this road any longer or again," or the like.

The processing can also then result in a subjective system output 247 of, route off of, or recalculate route away from, the present road as possible or practical. The command 247 is converted to an objective command 248, stored for later implementation (e.g., update user preferences or setting with mapping data relating the road to an avoid flag, in the available system states and possibly also or instead to the semantics and/or user-model databases), and executed via the execution module 210 as needed for adjusting the NAV system 116 presently.

As provided, the HMI 106 is in a contemplated embodiment configured to recommend or pursue a specific system (e.g., NAV system) adjustment under circumstances detected that match previous circumstances under which the user provided a communication 222 indicative of the specific system adjustment. In this case, the HMI 106 can later, e.g., recommend rerouting to an operator in response to the HMI 106 determining that there is the same, similar, or greater level of road bumps/holes (based, e.g., on context data 228 from context source 114, e.g., suspension systems). In various embodiments, the HMI 106, based on the setting made previously, and (i) automatically, (ii) without user objection, or (iii) with user approval, then executes the suggested action. The HMI can also set this type of decision as a user setting or preference (in e.g., the user-model database 112) for later automatic implementation, such as with user approval or by user request.

IV.C. Autonomous/Semi-Autonomous Driving Systems

The exemplary implementation with an autonomous or partially-autonomous driving system as the subject system 116 is now described further.

As provided, autonomous and semi-autonomous driving systems—e.g., automatic cruise control (ACC)—represent other vehicle systems 116 that can be personalized for a user(s) based on user communications 224, including indirect communications—e.g., utterance and/or gestures, alone or in combination with context data, semantics data, user model or settings/preferences data, and systems data.

As an example input 224, the user 222 may provide a communication in the form of an utterance of, "I am scared!" or "whoa, they're going slow."

The HMI 106 processing described, including all or any aspects shown in FIG. 2, for instance, can be performed to identify a precursor 238 of, e.g., "more separation distance in front."

The HMI processing can also then result in a subjective system output 247 of, e.g., slowing the vehicle, generally, or more specifically to attain a certain separation distance (measurable, e.g., by LIDAR and/or other vehicle sensors). The command 247 is converted to an objective command 248, stored for later implementation (e.g., to the available system states and possibly also or instead to the semantics and/or user-model databases), and executed via the execution module 210 as needed for adjusting the autonomous or semi-autonomous driving system 116.

As provided, the HMI 106 is in a contemplated embodiment configured to recommend or pursue a specific system (e.g., ACC system) adjustment under circumstances detected that match previous circumstances under which the user provided a communication 222 indicative of the specific system adjustment. In this case, the HMI 106 can later recommend that separation distance be reduced, or just state that the separation distance will be increase, or maintained from decreasing, or just increase or maintain from decreasing, the separation distance, in response to the HMI 106 determining that the same or similar conditions are present—e.g., the proximity to the vehicle in front being at the distance causing the user to be scared in the previous instance. Automatically or with user approval, based on the setting made previously, the HMI 106 then executes the suggested action. The HMI can also set this type of decision as a user setting or preference (in e.g., the user-model database 112) for later automatic implementation, such as with user approval or by user request.

IV.D. Audio System

The exemplary implementation with a navigation system as the subject system 116 is now described further.

Audio or sound systems—e.g., radio, telephone via microphone and speakers, navigation audio, customer service audio (e.g., OnStar® system audio—represent other systems 116 [e.g., a personal- (e.g., mobile-communication-device-), premises- (e.g., home- or hotel-), or object- (e.g., vehicle-) based system 116] that can be controlled in a personal manner for a user(s) based on user communications 224, including indirect communications—e.g., utterance and/or gestures, alone or in combination with context data, semantics data, user model or settings/preferences data, and systems data.

As an example input 224, the user 222 may provide a communication in the form of an utterance of, "the music sounds too tiny," or "the music sounds small."

The HMI 106 processing described, including all or any aspects shown in FIG. 2, for instance, can be performed to identify a precursor 238 of, e.g., "thicken music sound."

The HMI processing can also then result in a subjective system output 247 of, e.g., increase bass, lower treble, balance right. The command 247 is converted to an objective command 248, stored for later implementation (e.g., to the available system states and possibly also or instead to the semantics and/or user-model databases), and executed via the execution module 210 as needed for adjusting the sound system 116.

As provided, the HMI 106 is in a contemplated embodiment configured to recommend or pursue a specific system (e.g., audio system) adjustment under circumstances detected that match previous circumstances (e.g., same or similar type of song, similar vehicle occupant profile—e.g., driver alone) under which the user provided a communication 222 indicative of the specific system adjustment.

In this case, the HMI 106 can later recommend that separation distance be reduced, or just state that the audio be changed as such (e.g., increase bass, lower treble, balance right), or just make the change, in response to the HMI 106 determining that the same or similar conditions are present—e.g., same or similar type of song, similar vehicle occupant profile—that caused the user to complain of the music being too thin in the previous instance. Automatically or with user approval, based on the setting made previously, the HMI 106 then executes the suggested action. The HMI can also set this type of decision as a user setting or preference (in, e.g., the user-model database 112) for later automatic implementation, such as with user approval, lack of objection, or by user request.

As another audio system example, extended to include more than one user, assume that the sensor(s) 102 sense a back seat passenger 222 stating 224 "I cannot hear the music" or "I cannot hear what you are saying." The HMI 106 processing described, including all or any aspects shown in FIG. 2, for instance, can be performed to identify a precursor 238 of, e.g., "more radio volume to rear" or "lower radio volume to rear," respectively.

The HMI processing can also then result in a subjective system output 247 of, e.g., increase rear audio or decrease rear audio, respectively. The command 247 is converted to an objective command 248, stored for later implementation (e.g., to the available system states and possibly also or instead to the semantics and/or user-model databases), and executed via the execution module 210 as needed for adjusting the sound system 116.

As provided, the HMI 106 is in a contemplated embodiment configured to recommend or pursue a specific system (e.g., audio system) adjustment under circumstances detected that match previous circumstances (e.g., same vehicle occupant profile—e.g., driver and passengers, and, for the second example ("I can't hear you"), the driver speaking) under which the user 224 (back seat passenger) provided the communication 222 indicative of the specific system adjustment.

In this case, the HMI 106 can later recommend that the audio adjustment determined needed be taken, or suggested, in response to the HMI 106 determining that the same or similar conditions are present. And, automatically or with user approval, based on the setting made previously, the HMI 106 then executes the suggested action. The HMI can also set this type of decision as a user setting or preference (in e.g., the user-model database 112) for later automatic implementation, such as with user approval or by user request.

As a yet another audio example, the operator 222 may state, "It is too loud, I cannot hear myself." The resulting input 226 can lead, in the described operations of the HMI 106, to a precursor 238 of, e.g., lower audio for driver or front, and corresponding subjective and objective commands for execution.

V. AVAILABLE AND POTENTIAL SYSTEM STATES

FIG. 3 shows a schematic representation 300 of relations between example potential and available system states for a vehicle HVAC system.

The representation 300 includes a listing of all potential, or possible system states 310 and available system states 330. The available system states 330 are stored in the available-system-states database 108.

The possible system states 310 of this example include climate mode and fan speed. The example includes all combinations of (A) two settings for climate mode: 'eco', or 'economy' climate mode 312 (energy saving mode), and 'comfort' climate mode 314, and (B) six settings for fan speed: speeds ((1)-(6)), represented as 314, 316, 318, 320, 322, 324, respectively, rendering the illustrated twelve combinations 1-12. While the example includes two variables (climate mode and fan speed), the first having two settings and the latter having six, various embodiments can have less or more variables and available settings depending on design of the particular system.

The available system states 330 is organized according to fan power settings. Three fan-power settings 322, 334, and 336, are shown representing, by way of example, fan-power settings of 5%, 30%, and 50%, respectively. While three settings are shown, various embodiments can use less or more groups depending on design of the system.

Under the first fan-power setting 332, an example climate mode/fan speed combination 312/314, of the possible system state combinations 310, is shown. Under the second fan-power setting 334, two example climate mode/fan speed combinations 312/318 and 314/316, of the possible system state combinations 310, are shown. Under the third fan-power setting 336, another two example climate mode/fan speed combinations 312/324 and 314/320, of the possible system state combinations 310, are shown.

Regarding the available system state, 336, it is noted as an example of the flexibility of the available system states, that the third state 336 represents a new state, with 50% fan output. The state 336 is feasible by the fan blower, but not available in the existing states that show the user having only six discrete fan speed options ((1)-(6)), as represented by fan-speeds 314, 316, 318, 320, 322, 324 in FIG. 3.

Fan power of 50% can be achieved by way of different combinations of modes and fan speed levels. The speed levels are indicated by values 1-6.

Function of the goal-recognizer module 206 (i.e., again, the processor 105 executing code of the module 206) is indicated schematically by a first arrow 340. The goal recognizer 206 receives as input possible system states, and retrieves available system states. (Arrow 340)

Function of the translation module 208 (i.e., again, the processor 105 executing code of the module 208) is indicated schematically by a second arrow 350. The translation module 208 receives as input the available system states, form the goal recognizer 206, and retrieves all possible system states.

VI. EXAMPLE GOAL RECOGNIZER AND TRANSLATOR FUNCTIONS

The following two Function Summaries (1), (2) show textually example details of the functioning described above for the goal-recognizer module 206 and translation module 208. the example is provided in the context of a vehicle HVAC system. More particularly, the following two summary examples continue from the scenario of FIG. 3.

The first Summary (1), below, focuses on functions of the goal recognizer 206 with respect to three primary factors or inputs to the recognizer 206: (i) current system state(s) (e.g., data via path 246), (ii) precursor(s) (e.g., data of path 238), and (iii) available system state(s) (e.g., from available-system-states database 108 via path 252).

Function Summary (1)

```
{ /*CurrState=[CC=Eco,FS=3]*/
NewState = FindState (CurrState,DB)
/*NewState="FanPower 30%"*/
Goal= FindGoal(Precursor, NewState, DB)
/* Based on precursor, Goal= FanPower 50% */
Return Goal }
```

More specifically, the first Function Summary (1), above, shows, as a first input to the goal-recognizer module 206, a current system state (e.g., data 246). The example current system state includes a climate mode of 'eco' (or economy), and a fan speed of level 3. This state corresponds to the third state (blocks 312, 318) of the states 310 shown in FIG. 3.

Current state is given by 'eco' mode and fan speed equal to level 3. A new state is found by the searching the database with the current state values. This can lead to a new state by which, for example, fan power needs to be 30%. Then the database is searched to find a corresponding goal state.

The goal-recognizer module 206 is configured and arranged to, based on the stated inputs, generate the goal(s) 247, or subjective system output.

The second Summary (2), below, focuses on functions of the translation module 208 with respect to three primary factors or inputs to the translator 208: (i) current system state(s) (e.g., data via path 246), (ii) determined goal(s) (e.g., data of path 247), and (iii) available system state(s) (e.g., from available-system-states database 108 via path 252).

Function Summary (2)

```
{ /*Goal = "FanPower 50%"
CurrState = [CC=Eco, FS=3]*/
State = Search DB, choose state close to CurrState under Goal
Return State }
```

More specifically, the second Function Summary (2), above, shows as input to the translation module 208, the goal (247) indicating 50% fan power. The translator 208 also receives as input the referenced current-system-state data (i.e., 'eco' climate mode and level-3 fan speed)).

The current goal to attain is equal to achieving fan blower power of 50% while the current state is given by 'eco' mode and fan speed equal to level 3. The program will search the database of available states to choose an HVAC state that is closest to the current state, to achieve the goal.

The translator 208 is configured to, based on the stated inputs, generate a system goal(s) 247, or subjective system output.

VII. SELECT BENEFITS AND ADVANTAGES

The disclosure above describes many of the benefits and advantages of the present technology. The present section summarizes some of those and describes some, but not all, others.

The present technology allows personalized and sensitive control of one or more vehicle system parameters based at least in part on human user input, including especially implied or implicit input as compared to, e.g., strictly engineering or technical inputs, such as from the computing apparatus itself.

The present technology determines, based on user input, and in various embodiments ancillary input like that described, adjustments that would be optimal, or at least determined best or most appropriate under the circumstances, even if the user does not know what they want or need, does not know what system should be adjusted, or how, and/or a particular manner by which to initiate the adjustment.

The control provides the user(s) of the vehicle with benefits such as greater comfort and ease in vehicle use, for instance, including in a customized manner based on user behavior. The sensitive control of the apparatus and method performed can be referred to as sensitivity features.

Given the sensitivity features of the present technology, in combination with the related and overlapping containment features described above (e.g., interpreting actual user desires and intentions with respect to one or more adjustable vehicle systems), the technology can be referred to as a containment and sensitivity system—e.g., containment-and-sensitivity HVAC system, containment-and-sensitivity NAV system, containment-and-sensitivity autonomous-driving system, containment-and-sensitivity semi-autonomous driving system, and containment-and-sensitivity automatic-cruise-control system).

VIII. CONCLUSION

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. An apparatus, for implementation at a vehicle, comprising:
    a vehicle processing unit; and
    a non-transitory computer-readable storage device comprising:
        an input module that, when executed by the vehicle processing unit, receives, from a microphone, user-communication data including user-indiscriminate-utterance data indicating an indiscriminate utterance, not including words, received at the microphone from a user and receives, from a sensor, context data indicating a state of a vehicle system;
        an interpretation module that, when executed by the vehicle processing unit, interprets the user-indiscriminate-utterance data of the user-communication data and the context data, yielding an interpretation output identifying a user need indicated by the user-indiscriminate-utterance data of the user-communication data and the context data;
        an analysis module comprising:
            a goal-recognizer module that, when executed by the vehicle processing unit, generates, based on the interpretation output and user-specific data representing a user condition, a subjective system output indicating a manner by which to adjust a controllable vehicle system to achieve the user need identified; and a translation module that, when executed by the vehicle processing unit, generates, based on the subjective system output, an objective system command for use in adjusting the controllable vehicle system toward meeting the user need identified; and an activity-execution module that, when executed by the vehicle processing unit, executes the objective system command by adjusting the controllable vehicle system, based on the objective system command, toward meeting the user need indicated by the user indiscriminate utterance sensed by the microphone.

2. The apparatus of claim 1, wherein:

at least one of the interpretation module, the goal-recognizer module, and the translation module processes non-gesture context data to yield module output; and the non-gesture context data includes environmental data indicating a characteristic of an environment at or proximate the controllable vehicle system.

3. The apparatus of claim 1, wherein:

at least one of the interpretation module, the goal-recognizer module, and the translation module processes non-gesture context data to yield module output; and the non-gesture context data indicates a user-specific characteristic.

4. The apparatus of claim 3, wherein:

the user-specific characteristic is indicated by user-specific profile data received from a user-model database; and the user-model database includes various user-specific profile data corresponding respectively to each of multiple users.

5. The apparatus of claim 1, wherein:

one or more modules of the non-transitory computer-readable storage device comprise feedback-based-learning code that, when executed by the vehicle processing unit:

generates, based in interactions with the user, learned user information; and stores the learned user information for use to improve subsequent apparatus operation; and one or more modules of the non-transitory computer-readable storage device uses the learned user information later to improve the subsequent apparatus operation.

6. The apparatus of claim 5, wherein:

the objective system command is a first objective system command;

in operation of the apparatus, the interactions with the user comprise interactions after the translation module, when executed by the vehicle processing unit, generates the first objective system command; and the translation module, when executed by the vehicle processing unit in the subsequent apparatus operation, uses the learned use information in generating a second objective system comment.

7. The apparatus of claim 1 wherein the user-communication data comprises the indiscriminate utterance, which does not include any words, or includes at least a portion of one word.

8. An apparatus, for implementation at a vehicle, comprising:

a vehicle processing unit; and a non-transitory computer-readable storage device comprising:

an input module that, when executed by the vehicle processing unit:

receives, from a tangible, hardware-based, sensor, user-indiscriminate-communication data indicating an indiscriminate user communication, not including words;

receives, from the user, non-gesture context data; and receives, from a vehicle sensor, vehicle context data indicating a state of a vehicle system;

an interpretation module that, when executed by the vehicle processing unit, interprets the user-indiscriminate-communication data, non-gesture context data, and vehicle context data, yielding an interpretation output identifying a user need indicated by the user-indiscriminate-communication data, non-gesture context data, and vehicle context data;

an analysis module comprising:

a goal-recognizer module that, when executed by the vehicle processing unit, generates, based on the interpretation output and user-specific data representing a user condition, a subjective system output indicating a manner by which to adjust a controllable vehicle system to achieve the user need identified; and a translation module that, when executed by the vehicle processing unit, generates, based on the subjective system output, an objective system command for use in adjusting the controllable vehicle system toward meeting the user need identified; and an activity-execution module that, when executed by the vehicle processing unit, executes the objective system command by adjusting the controllable vehicle system, based on the objective system command, toward meeting the user need indicated by the user-indiscriminate-communication data generated by the tangible, hardware-based, sensor.

9. The apparatus of claim 8, wherein the non-gesture context data indicates one or both of:

a characteristic of an environment at or proximate the controllable vehicle system; and a user-specific characteristic.

10. The apparatus of claim 8, wherein:

the non-gesture context data indicates a user-specific characteristic;

the user-specific characteristic is, in operation of the apparatus, obtained from a user-specific profile of a user-model database;

the user-specific profile is a first user-specific profile; and the user-model database comprises multiple distinct user-specific profiles, including the first user-specific profile, corresponding to various users.

11. The apparatus of claim 8, wherein the user-indiscriminate-communication data comprises an indiscriminate utterance, which does not include any words, or includes at least a portion of one word.

12. An apparatus, for implementation at a vehicle, comprising:

a vehicle processing unit; and a non-transitory computer-readable storage device comprising:

an input module that, when executed by the vehicle processing unit:
  receives, from a tangible, hardware-based, sensor, user-indiscriminate-communication data indicating an indiscriminate user communication, not including words;
  receives prior-learned user data, generated based on a prior user interaction with the apparatus; and
  receives, from a vehicle sensor, vehicle context data indicating a state of a vehicle system;
an interpretation module that, when executed by the vehicle processing unit, interprets, based on the prior-learned user data, the user-indiscriminate-communication data, and vehicle context data yielding an interpretation output identifying a user need indicated by the user-indiscriminate-communication data and vehicle context data;
an analysis module comprising:
  a goal-recognizer module that, when executed by the vehicle processing unit, generates, based on the interpretation output and user-specific data representing a user condition, a subjective system output indicating a manner by which to adjust a controllable vehicle system to achieve the user need identified; and
  a translation module that, when executed by the vehicle processing unit, generates, based on the subjective system output, an objective system command for use in adjusting the controllable vehicle system toward meeting the user need identified; and
an activity-execution module that, when executed by the vehicle processing unit, executes the objective system command by adjusting the controllable vehicle system, based on the objective system command, toward meeting the user need indicated by the user-indiscriminate-communication data generated by the tangible, hardware-based, sensor.

13. The apparatus of claim 12, wherein:
one or more modules of the non-transitory computer-readable storage device comprise feedback-based-learning code that, when executed by the vehicle processing unit:
  generates, based in interactions with the user, learned user information; and
  stores the learned user information for use to improve subsequent apparatus operation; and
one or more modules of the non-transitory computer-readable storage device uses the learned user information later to improve the subsequent apparatus operation.

14. The apparatus of claim 13, wherein:
the objective system command is a first objective system command;
in operation of the apparatus, the interactions with the user comprise interactions after a translation module, when executed by the vehicle processing unit, generates the first objective system command; and
the translation module, when executed by the vehicle processing unit in the subsequent apparatus operation, uses the learned use information in generating a second objective system comment.

15. The apparatus of claim 12, wherein the user-indiscriminate-communication data comprises an indiscriminate utterance, which does not include any words, or includes at least a portion of one word.

* * * * *